UNITED STATES PATENT OFFICE.

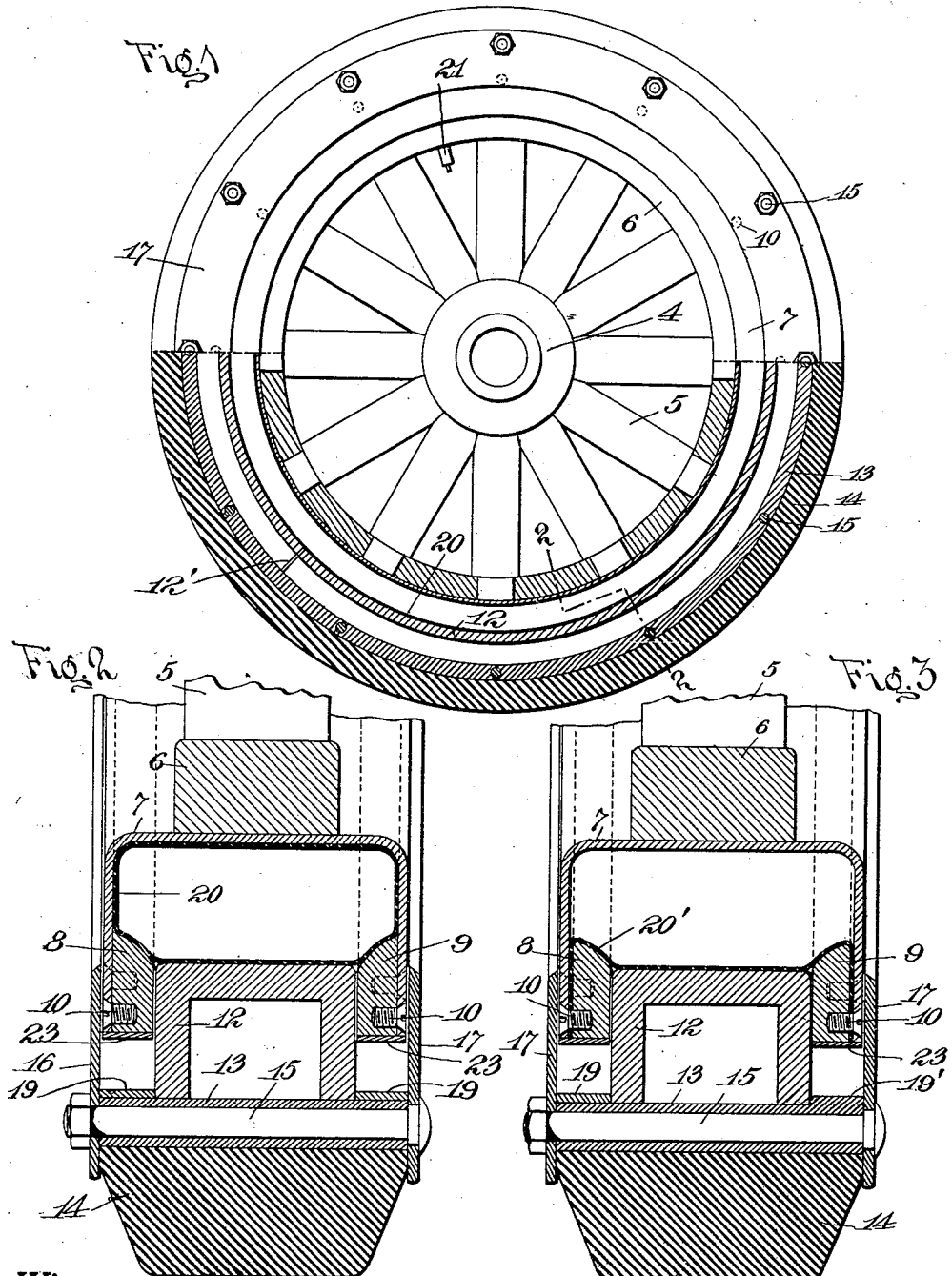

ALEXANDER B. SIMPSON, OF NEW YORK, N. Y.

VEHICLE-WHEEL.

1,008,083.   Specification of Letters Patent.   Patented Nov. 7, 1911.

Application filed December 31, 1910. Serial No. 600,291.

*To all whom it may concern:*

Be it known that I, ALEXANDER B. SIMPSON, a citizen of the United States, residing in the borough of Brooklyn, county of Kings, city and State of New York, have invented certain new and useful Improvements in Vehicle-Wheels, of which the following is a specification.

My invention relates to vehicle wheels, and particularly to the type of wheel characterized by an inner rim and a movable outer rim and a cushion of some kind between said rims.

Among the general objects of my invention are the provision of a wheel of the type above-named, which is simple and rugged in construction, easy to assemble and repair, efficient in operation, and which is capable of satisfactory use when the cushioning device is inactive, without injury to said cushioning device, or to any other part of the wheel.

My invention will be fully understood, and further objects and advantages thereof will appear from a consideration of the embodiments of said invention set forth in the following specification and accompanying drawings considered together or separately.

In the drawings, Figure 1, is a side elevation, partly in the section, of a wheel having my invention embodied therein; Fig. 2 is a cross-section transversely and diametrically through the rim of the wheel on the line 2—2 of Fig. 1; and Fig. 3 is a view similar to Fig. 2, showing a modification.

Like parts are designated by the same reference characters throughout the drawings.

Referring to the drawings, the hub of the wheel is indicated at 4, the spokes at 5 and the felly at 6, said parts being of any suitable and well-known construction. Surrounding the felly 6, and secured thereto in any suitable manner as by being shrunk thereon, is a U-shaped inner rim 7, preferably made of sheet metal such as steel bent to the shape indicated in the drawings. Attached to the inside of the rim 7 as shown are rings 8 and 9 which give the inner rim 7 thickened edges. The said rings 8 and 9 may be of any suitable material, such for example as steel, fiber or aluminum, and in the embodiment of my invention shown in Fig. 2 may be secured to the sides of the inner rim 7 by any suitable means such as screws 10. In order to permit insertion of the rings 8 and 9 within the inner rim, said rings either may be cut through at some point to permit their being sprung out, or may be made in a plurality of pieces.

The wheel is provided with an outer rim having a filling ring 12, preferably made light by being made of U-shaped cross-section as shown, and of such a size that it is capable of movement within the space between the rings 8 and 9. The diametrical dimensions of said ring 12, with reference to the inner rim 7 and the rings 8 and 9, is apparent from the drawings. The filling ring 12 may be made of any suitable material such as aluminum, steel or wood, and said ring may either be split at some point, as at 12', or may be made in a plurality of pieces in order to permit assembling, as in the case of the rings 8 and 9. Surounding the said ring 12, and of a size to snugly coöperate with the outside of said ring 12, is a tread-supporting ring 13 which may be of any suitable material, such as aluminum, wood or steel. The ring 13 carries the tread 14 of rubber or other suitable substance formed in any desired shape and secured to the ring 13 in any suitable manner, as for example, by being stretched and forced onto said ring. Secured to the edges of the ring 13 by means of bolts 15 are side plates 16 and 17 in the form of rings. The inner parts of said side plates 16 and 17 extend over a portion of the outer sides of the inner rim 7 and slidingly coöperate therewith, and the outer parts of said side plates extend sufficiently beyond the outer surface of the ring 13 to coöperate with the edges of the tread 14, thereby helping to hold said tread in place. In order to properly position the filling ring 12 and the tread-supporting ring 13 with reference to one another, a spacing ring 19 is provided, as shown, between each side of the filling ring 12 and the adjacent side plate 16 or 17, as shown in Fig. 2. These rings may be split to permit their easy insertion and removal, and if desired one of them may be replaced by a lug 19' of the same shape made integral with the ring 13 as shown in Fig. 3.

From the foregoing description it will be apparent that, in the arrangements illustrated, the movable outer rim comprises the filling ring 12, the tread-supporting ring 13, the two spacing rings 19 (or one ring 19 and lug 19'), the tread 15, and the side plates 16 and 17 which may at any time be removed to permit disassembling of the parts.

In Fig. 1 the cushioning device is shown as comprising an elastic tube 20 which, when filled with air under pressure, no matter what the position of the outer rim, completely fills the space between the inner rim 7, the rings 8 and 9, and the filling ring 12. This tube 20 may be made of any suitable flexible elastic material such as rubber, and is provided with the usual pneumatic tire valve tube 21 which extends inwardly through a hole in the felly.

The thickened outer edges of the inner rim 7, formed by the rings 8 and 9, are provided with any suitable frictional material such as rubber, as shown at 23, for the purpose of providing a frictional non-slipping engagement between the thickened edges of the inner rim 7 and the outer tread-supporting ring 13, when the pneumatic tube is deflated and the said rim 7 and ring 13 are in an engagement at the bottom of the wheel.

The arrangement illustrated in Fig. 3 differs from that shown in Fig. 2 only in the pneumatic cushion. In Fig. 3, instead of a separate tube the air chamber is formed by the inner rim 7 and a sheet 20' of flexible elastic material such as rubber, which lies over the inner parts of the rings 8 and 9 and over the inner portion of the filling ring 12 and has its edges confined between the rings 8 and 9 and the sides of the inner rim 7, as shown in Fig. 3. With this arrangement the valve tube 21, through which air under pressure is supplied to the air chamber, is attached to the inside portion of the inner rim 7 and extends through the felly.

It is obvious that with both of the arrangements of Figs. 2 and 3 a pneumatic cushion is provided between the inner rim and the outer movable rim, and that there is no possibility of either the tube 20 or the sheet 20' being pinched and injured while the wheel is in use. This will be understood from the fact that the internal width of the inner rim member is less near the outer portion of said rim—that is between the rings 8 and 9—than nearer the inner portion—that is between the side walls of the inner rim 7. With this arrangement in normal operation, and even when the tube 20 is deflated or when the pressure of the air within the chamber is insufficient to support the outer rim at its outer position, the filling ring 12 will move within the inner rim, flexing the middle portion of the tube 20 or the middle portion of the sheet 20', but never pinching the tube or sheet; in other words, even when the cushioning element is inoperative the wheel is still capable of use without injury to any of its parts.

In the preferred form of my invention I use the pneumatic tube shown in Fig. 2, and make the rings 8 and 9, the filling ring 12, the spacing rings 19 and the tread-supporting ring 13 of aluminum, and the U-shaped inner rim 7 and the side plates 16 and 17 of steel, thereby securing a strong and at the same time light construction.

While I have shown certain constructions in which my invention may be embodied, I wish it to be understood that these are only illustrative and that my invention as defined in the appended claims may be carried out by other arrangements.

Having now described my invention, what I claim as new and desire to secure by Letters Patent, is:

1. A vehicle wheel comprising a felly; a U-shaped one-piece inner rim having parallel sides secured to said felly, and rings secured to the inside of the sides of said inner rim near the circumference thereof; an outer rim comprising a filling ring movably arranged between said first-named rings, a tread supporting ring surrounding said filling ring, side plates, and bolts passing through said side plates and said tread supporting ring for holding said side plates and said ring together and for holding said plates in sliding engagement with the outside of the sides of said inner rim; and elastic means for confining air within the entire space between said inner and outer rims.

2. A vehicle wheel comprising an inner U-shaped rim having thickened edges, a filling ring movably arranged between said thickened edges, a tread-supporting ring surrounding said filling ring, side plates, bolts passing through said side plates and the tread-supporting ring for attaching said side plates to said ring and for holding said plates in sliding engagement with the outside of said inner rim, spacing rings between said filling ring and said side plates, and an elastic pneumatic tube filling the space between said inner rim and said filling ring.

This specification signed and witnessed this 29th day of December, 1910.

ALEXANDER B. SIMPSON.

Witnesses:
HOWARD M. MORSE,
JOHN L. LOTSCH.

---

Copies of this patent may be obtained for five cents each, by addressing the "Commissioner of Patents, Washington, D. C."